(No Model.)
O. B. SHALLENBERGER.
SYSTEM OF GENERATORS FOR ALTERNATING ELECTRIC CURRENTS.
No. 404,567. Patented June 4, 1889.
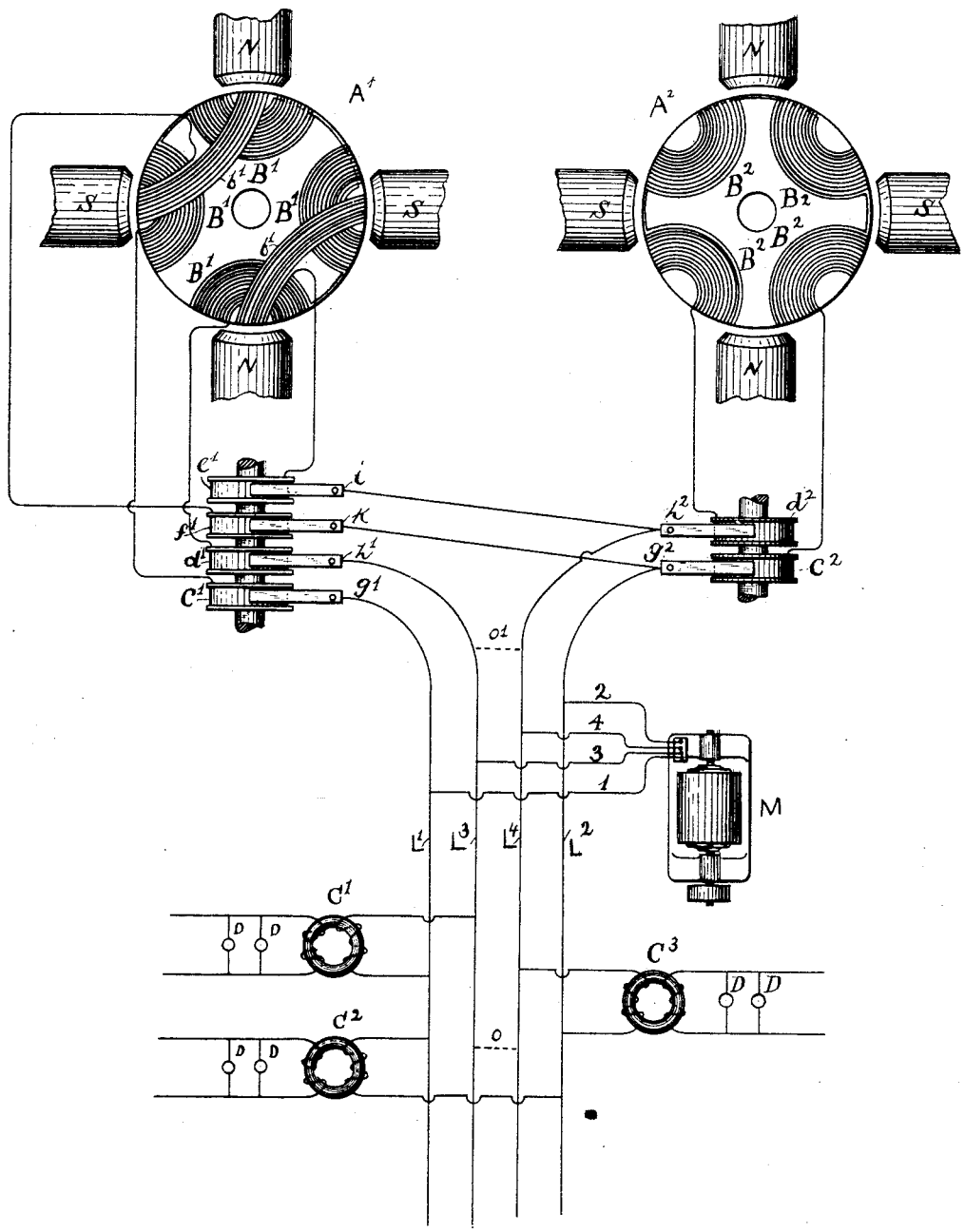
WITNESSES:
George Brown Jr.
W. H. McCullogh
INVENTOR,
Oliver B. Shallenberger.
BY
Pope, Edgcomb & Terry
ATTORNEYS.

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

SYSTEM OF GENERATORS FOR ALTERNATING ELECTRIC CURRENTS.

SPECIFICATION forming part of Letters Patent No. 404,567, dated June 4, 1889.

Application filed September 8, 1888. Serial No. 284,896. (No model.)

*To all whom it may concern:*

Be it known that I, OLIVER B. SHALLENBERGER, a citizen of the United States, residing in Rochester, in the county of Beaver and State of Pennsylvania, have invented certain new and useful Improvements in Systems of Generators for Alternating Electric Currents, (Case 230,) of which the following is a specification.

The invention relates to systems of distribution of energy by alternating electric currents in which two or more generators are employed; and the object of the invention is to provide simple, efficient, and reliable means for maintaining the armatures of two independent generators delivering alternating currents in certain relative positions with reference to each other, or, in other words, causing them to deliver their currents so that their phases shall have a predetermined relation to each other in time. Thus, if it is desired to obtain from two independent circuits supplied by independent generators for any purpose electric currents the phases of which differ in time, it is necessary that the generators themselves should be maintained in a certain definite relation to each other.

In carrying out the invention there is applied to the armature of one of the generators supplemental coils, which are connected in parallel with the main generating-coils of the other armature. The current delivered by these supplemental coils tends to hold the armature of the other generator in the same position with reference to its field-magnets as is occupied by the supplemental coils, and vice versa. The currents therefore delivered by the two generators upon their respective circuits will have their phases coinciding or differing from each other in time by an amount dependent upon the position occupied by the supplemental coils upon the armature with reference to the position of the main generating-coils upon that armature. In building the armature it may be convenient to construct them all with supplemental coils, and then in practice use only those which may be required.

In the accompanying drawing there is shown in diagram an organization of circuits and apparatus illustrating the invention.

Referring to the figure, $A'$ and $A^2$ represent the armatures of two alternate-current electric generators. These revolve between their respective field-magnets, the poles of which are represented at N S, N S. The armature $A'$ is wound with generating-coils $B'$ $B'$ and the armature $A^2$ with generating-coils $B^2 B^2$ in a manner well understood. The coils $B'$ have their respective terminals connected with collecting-rings $c'$ $d'$, to which are applied brushes $g'$ $h'$, which are respectively connected with lines $L' L^3$, leading to the work-circuit. A converter $C'$ is shown as having its primary coils connected between the conductors $L'$ $L^3$ and as having its secondary coil connected with translating devices, such as incandescent lamps D D.

The coils $B^2 B^2$ of the armature $A^2$ have their respective terminals connected with collector-rings $c^2$ $d^2$. Brushes $g^2$ $h^2$ rest upon these rings, and are respectively connected with main lines $L^2 L^4$. These in turn supply translating devices D D through a converter $C^3$. If now it is desired for any reason to cause the armatures to revolve in synchronism with each other, it may be accomplished in the following manner: Supplemental coils $b'$ $b'$ may be wound upon the armature $A'$ in a position dependent upon the relative times which it is desired that the phases of the currents upon the two circuits shall have. Thus in the drawing they are shown with their axis at an angle of forty-five degrees to the axis of the coils $B' B'$, and therefore in the particular organization shown the phases of the currents developed in the coil $b'$ will be separated in time from the phases of the currents delivered by the coils $B'$ by one-quarter of a period. The terminals of the coils $b'$ are connected with collector-rings $e'$ $f'$, respectively, and these are supplied with brushes $i$ $k$, which are respectively connected with the brushes $h^2$ $g^2$, so that the currents from the supplemental coils are led through the coils $B^2$ of the armature $A^2$. This will cause the two armatures to synchronize in a manner well understood, and the phases of the currents upon the two circuits $L' L^3$ and $L^2 L^4$ will differ from each other by one-quarter of a period. It is evident that this relation may be varied by changing the position of the coils $b'$ with reference to the coils $B'$. If now it is desired to operate an electric motor M, for instance, of the character in which two windings are employed, which windings are designed to be traversed by alternating currents the phases of which differ in time, then one set of windings may be connected with the circuit $L'$ $L^3$ and the other with the circuit $L^2$ $L^4$, as represented by the conductors 1 3 and 2 4.

In some instances it may be desirable to derive from the currents upon the two circuits thus supplied an independent current due to the combination or superposition of the currents delivered by the two generators. I have discovered that two alternating currents whose phases differ in time by a proper amount when superposed produce a resultant alternating current, the effects of which in many instances are equivalent to a single alternating current, and thus by connecting the primary coil of the converter $C^2$ between the lines $L'$ $L^2$ and connecting the lines $L^3$ and $L^4$ with each other, as indicated by the dotted line $o$, the currents from the two machines will be superposed and the lights $D^2$ in the secondary circuit of the converter will be operated by reason of the resultant current.

In some instances it may be desired to employ but one conductor in place of the two conductors $L^3$ and $L^4$. Thus the line $L^4$ may be united with the line $L^3$ near the generator, as indicated by the dotted line $o'$, and the line $L^4$ then dispensed with.

I claim as my invention—

1. The combination of two alternating-current electric generators and synchronizing-coils applied to the armature of one of the generators and connected in parallel with the coils of the other generator.

2. The combination of two alternating-current electric generators and their circuits and synchronizing-coils applied to the armature of one of the generators and connected in parallel with the coils of the other generator and having their magnetic axis at an angle with reference to the main coils of the first-named generator.

3. The combination, with two alternating-current electric generators, of synchronizing-coils applied to the armature of one of the generators and connected in parallel with the coils of the other generator, translating devices operated from the respective circuits of said armatures, and a single apparatus deriving independent currents from the circuits of said generators.

4. The combination, with two alternating-current electric generators delivering two currents differing in the time of their phases, of translating devices deriving currents from the respective generators and other translating devices deriving currents due to the superposition of the two currents of the said generators.

In testimony whereof I have hereunto subscribed my name this 7th day of September, A. D. 1888.

OLIVER B. SHALLENBERGER.

Witnesses:
C. C. WOLFE,
CHARLES A. TERRY.